United States Patent [19]
Flowers

[11] Patent Number: 5,898,483
[45] Date of Patent: Apr. 27, 1999

[54] METHOD FOR INCREASING LADAR RESOLUTION

[75] Inventor: Edward Max Flowers, Grand Prairie, Tex.

[73] Assignee: Lockheed Martin Corporation, Dallas, Tex.

[21] Appl. No.: 08/845,980

[22] Filed: May 1, 1997

[51] Int. Cl.$^6$ .................................. G01C 3/08; G01J 5/02
[52] U.S. Cl. ........................................ 356/4.01; 356/5.01
[58] Field of Search ................................ 356/4.01, 5.01, 356/141.4; 250/342

[56] References Cited

U.S. PATENT DOCUMENTS

| | | | |
|---|---|---|---|
| 4,294,544 | 10/1981 | Altschuler et al. | 356/376 |
| 4,948,258 | 8/1990 | Caimi | 356/376 |
| 5,200,606 | 4/1993 | Krasutsky et al. | 250/216 |
| 5,224,109 | 6/1993 | Krasutsky et al. | 372/29 |
| 5,285,461 | 2/1994 | Krasutsky et al. | 372/29 |
| 5,345,304 | 9/1994 | Allen | 356/5 |
| 5,477,383 | 12/1995 | Jain | 359/565 |
| 5,552,893 | 9/1996 | Akasu | 356/5.01 |
| 5,638,164 | 6/1997 | Landau | 356/5.01 |
| 5,701,326 | 12/1997 | Flowers | 372/99 |

FOREIGN PATENT DOCUMENTS

| | | | |
|---|---|---|---|
| 2 300 325 | 10/1996 | United Kingdom . | |
| 93/01465 | 1/1993 | WIPO | F41G 7/22 |

OTHER PUBLICATIONS

EPO Search Report.

*Primary Examiner*—Mark Hellner
*Attorney, Agent, or Firm*—Arnold, White & Durkee

[57] ABSTRACT

The invention is a method for increasing the resolution of LADAR data. In one embodiment of the invention wherein the LADAR data is generated from a split beam laser signal transmitted at a given elevation scan rate and a given azimuth scan rate, the method includes reducing the elevation scan rate by which the laser signal is transmitted by a factor of n; and reducing the azimuth scan rate by which the laser signal is transmitted by a factor of m; wherein n and m are integers greater than 1.

17 Claims, 6 Drawing Sheets

---

Reduce the elevation scan rate by which the laser signal is transmitted by a factor of *n*, wherein *n* is an integer greater than 1

↓

Reduce the azimuth scan rate by which the laser signal is transmitted by a factor of m, wherein m is an integer greater than 1

Reduce the elevation scan rate by which the laser signal is transmitted by a factor of *n*, wherein *n* is an integer greater than 1

Reduce the azimuth scan rate by which the laser signal is transmitted by a factor of *m*, wherein *m* is an integer greater than 1

LADAR Range Image at 0.4 mrad Resolution

LADAR Intensity Image at 0.4 mrad Resolution

Target Verification at
increased resolution

Target Verification at
increased resolution

METHOD FOR INCREASING LADAR RESOLUTION

BACKGROUND OF THE INVENTION

1. Field of the Invention

This invention relates generally to laser detection and ranging ("LADAR") systems and, more particularly, to a method for increasing resolution of LADAR systems.

2. Description of Related Art

LADAR systems are finding many applications for locating and identifying objects including, in military environments, automatic target recognition ("ATR") systems. One such system is shown in FIG. 1. A laser signal 10 is transmitted by an optics package (not shown) on platform 12 to scan a geographical area called a scan pattern 14. Each scan pattern 14, which is sometimes referred to as a "footprint," is generated by scanning elevationally, or vertically, several times while scanning azimuthally, or horizontally, once. FIG. 1 illustrates a single elevational scan 15 during the azimuthal scan 18 for one of the footprints 14. Thus, each footprint 14 is defined by a plurality of elevational scans 16 such as the elevational scan 15 and the azimuthal scan 18. The principal difference between the successive footprints 14 is the location of the platform 12 at the start of the scanning process. An overlap 20 between the footprints 14 is determined by the velocity of the platform 12 in the direction of an arrow 21. The velocity, depression angle of the sensor with respect to the horizon, and total azimuth scan angle of the LADAR platform 12 determine the footprint 14 on the ground.

The laser signal 10 is typically a pulsed signal and may be either a single beam or a split beam. Because of many inherent performance advantages, split beam laser signals are typically employed by most LADAR systems. As illustrated in FIGS. 2A-2B, a single beam 22 may be split into several beamlets 24. The particular split-beam signal in FIGS. 2A-2B is formed by splitting a single beam 22 into a group 26 of seven beamlets 24, referred to collectively as a septet. The beamlets 24 are spaced apart from one another by an amount determined by the optics package (not shown) aboard the platform 12 transmitting the laser signal 10. This amount of separation is known as the "beam separation," and is referenced by numerals 25 and 27 in FIG. 2B. The azimuthal beam spacing 25 is the spacing between the individual beamlets 24 in the horizontal direction of arrow 33 in FIG. 2B. The azimuthal beam spacing 25 is determined by the beam splitter of the optics package (not shown). The elevational beam spacing 27 is the spacing between the groups 26 in the vertical direction of arrow 29 in FIG. 2B. The elevational beam spacing 27 between the groups 26 is determined by the rate of the elevational scan 16 (shown in FIG. 1) by the optics package (not shown) in the direction of arrow 29 in FIG. 2B.

Each pulse of the single beam 22 is split, and so the laser signal 10 transmitted during the elevational scan 16 in FIG. 1 is actually a series of grouped beamlets 24 like group 26. A single elevational scan of such a series of grouped pulses will be referred to, for present purposes, as a "nod." Nods are spaced apart from one another in a manner similar to groups 26. This separation shall be referred to as a nod spacing and is represented by the numeral 31 in FIG. 2B. Nod spacing 31 is determined by the rate of the azimuthal, or horizontal, scan 18 in the direction of arrow 33.

Returning to FIG. 1, the optics package aboard platform 12 transmits the groups 26 while scanning elevationally 16 and azimuthally 18. The scan pattern 14 therefore comprises a series of successive nods like elevational scan 15. Thus, the number of nods 15 in scan pattern 14 is determined by the rate of azimuth scan 18 rate and the number of beam groups 26 in any one nod 15 is determined by the rate of elevation scan 16. The elevation scan rate and the azimuth scan rate consequently influence the amount of information, or resolution, that can be obtained by a given optics package.

The laser signal 10 is continuously reflected back to the platform 12 which receives the reflected laser signal. The total return from each scan pattern 14 is known as a scan raster 14. Data is obtained from the received signal and processed. The type of processing will depend largely on the data obtained from the reflected laser signal 10 and the application to which the LADAR system is employed. For instance, the data may be processed to display an image or to provide image data for use in identifying an object detected within a scan pattern 14. The reflected signal is comprised of azimuthally spaced nods or groups of beamlets 24. The returned nods are combined to create a nod pattern comprised of pixels such as that illustrated in FIG. 3, each pixel corresponding to a single one of the reflected beamlets 24.

The resolution of data obtained from such a LADAR system results from several design trade-offs including how many pixels are needed on target to provide the automatic target recognition enough range information to autonomously identify targets. Other factors include the scan angles, the range, and the range accuracy of the system. The LADAR scan angle is determined by the velocity of the vehicle used to carry it. The faster the vehicle, the narrower the scan angle. For a given scan angle, the faster the platform 12 travels the greater the gap, or the smaller the overlap 20, on the ground between footprints 14. The scan angle is then set to provide a large ground coverage as well as sufficient overlap between scans to capture the desired target at the maximum vehicle speed. The LADAR range is influenced by the laser power, telescope collection aperture, detector response and system resolution. The range accuracy is influenced by the laser pulse widths and the pulse capture electronics.

A practical LADAR system design is based upon balancing several conflicting parameters. The ideal LADAR system would have high angular resolution, large scan angles, long range, a high range accuracy, and be very inexpensive. High angular resolution means that the angular spacing between pixels, i.e., reflected beamlets 24, is very small which results in many more pixels on the target of interest making it easier to "see." The larger the scan angles, the larger the area which can be searched for targets. The longer the range capability of the LADAR, the sooner the target can be found and the threat determined. Range accuracy is defined as how small of a range change can be resolved by the LADAR. The cost of the system is also frequently a major driver in the design. Each of these parameters are traded against the other to get the best system for the particular application.

However, it is desirable to still further increase the resolution of the data obtained from such a LADAR system. Further altering any one of the traditional design constraints will inherently alter the compromise achieved in any such design and so it is desirable to increase resolution without altering any of those factors. Still further, it is desirable to increase LADAR resolution without necessitating changes in the optics packages currently used in LADAR systems. Thus, there is a need for a new technique to improve LADAR resolution.

SUMMARY OF THE INVENTION

In one aspect of the present invention, a method is provided for increasing the resolution of LADAR data. In one embodiment of the invention wherein the LADAR data is generated from a split beam laser signal transmitted at a given elevation scan rate and a given azimuth scan rate, the method includes reducing the elevation scan rate by which the laser signal is transmitted by a factor of n; and reducing the azimuth scan rate by which the laser signal is transmitted by a factor of m; wherein n and m are integers greater than 1.

BRIEF DESCRIPTION OF THE DRAWINGS

A more particular description of the invention briefly summarized above is set forth below by way of particular embodiments disclosed in the drawings of this specification and as described in connection therewith. The drawings nevertheless illustrate only typical, particular embodiments of the invention and are not to be considered limiting thereon as the invention may admit to other equally effective embodiments. In the drawings.

DESCRIPTION OF PARTICULAR EMBODIMENTS

Numerous specific details are set forth below in the detailed description of particular embodiments to provide a thorough understanding of the present invention. However, one of ordinary skill in the art having the benefit of this disclosure will understand that the present invention may be practiced without many of the details presented since such details will be necessary or useful depending on the particular embodiment being employed. Conversely, in other instances, well known details have not been described for the sake of clarity so as not to obscure the invention. It will be appreciated that supplying such details would be a routine undertaking for those of ordinary skill in the art, even if a complex and time-consuming task, given the benefit of this disclosure.

Figure 4:
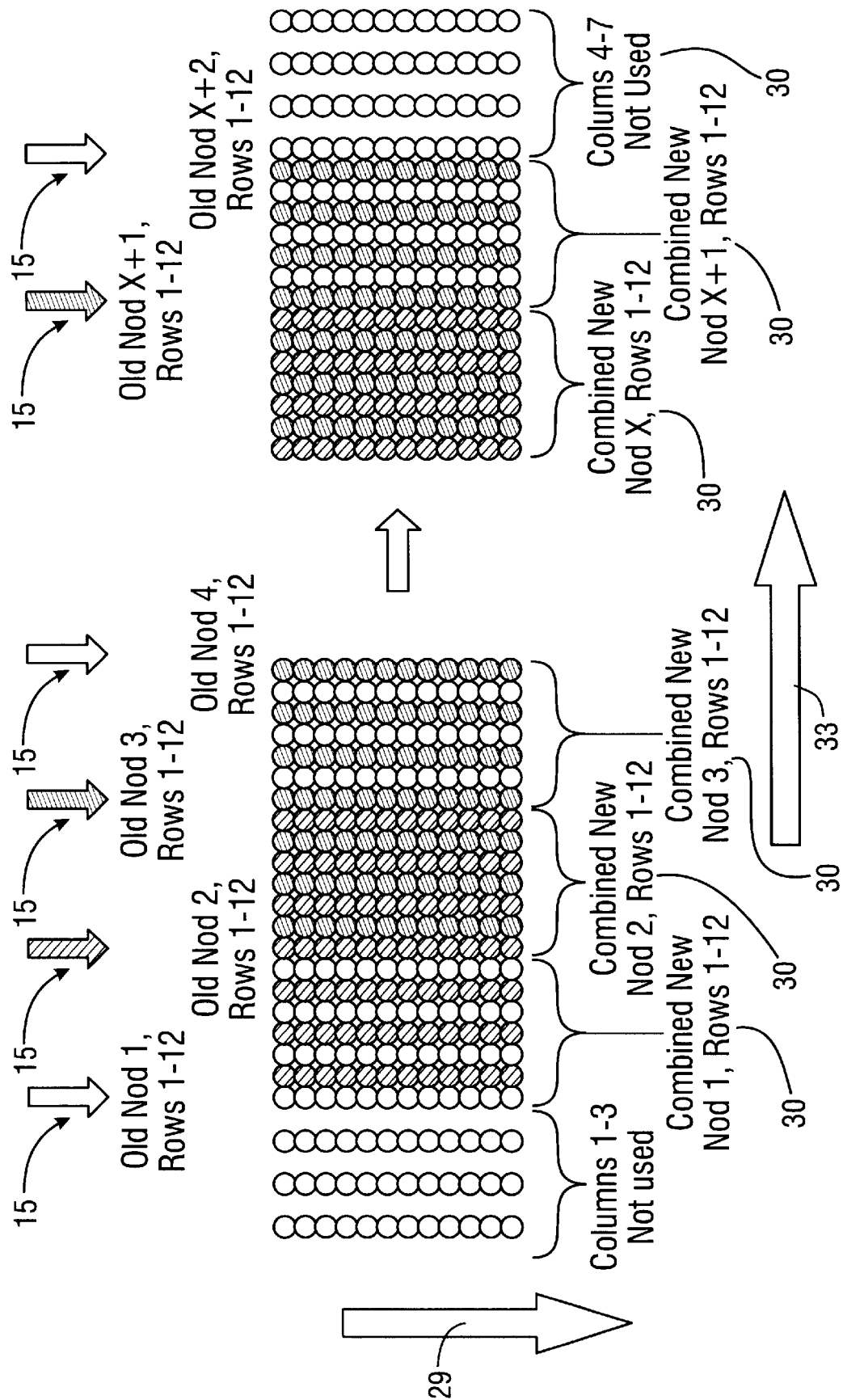
FIG. 4 depicts a nod pattern produced by an embodiment of the invention as diagrammed in FIG. 5.
Figure 5:
FIG. 5 diagrams one embodiment of a method for increasing LADAR data resolution in accord with present invention.

One embodiment for increasing LADAR system resolution in accordance with the instant invention is illustrated in FIGS. 4–5. In the embodiment illustrated, the LADAR system employs a split beam laser signal transmitted at a given elevation scan rate and at a given azimuth scan rate. In this embodiment, the elevation scan rate at which the laser signal is transmitted is reduced by a factor of n and the azimuth scan rate at which the laser signal is transmitted is reduced by a factor of m. The factor n reduces the elevational spacing among the groups 26 of the beamlets 24 and the factor m reduces the azimuthal spacing between the successive nods 15. The factors n and m may be equal to one another, but the invention is not so limited in this respect. Further, at least one of n or m must be greater than 1 to achieve any increase in resolution.

FIG. 4 illustrates the effect on spacing between the groups 26 of the beamlets 24 and between nods 15 caused by reducing the elevational scan rate and the azimuthal scan rate in accordance with the invention. In this particular embodiment, n and m are equal to 2, thus doubling the resolution of the LADAR data. The new nods 30 are created by combining the old nods 15 as shown. The first three columns 32 from the first old nod 15 and the last four columns 34 from the last old nod 15 are not used and may be discarded. As indicated, the combined new nods 30 have twice the angular resolution as the old nods 15.

Figure 1:
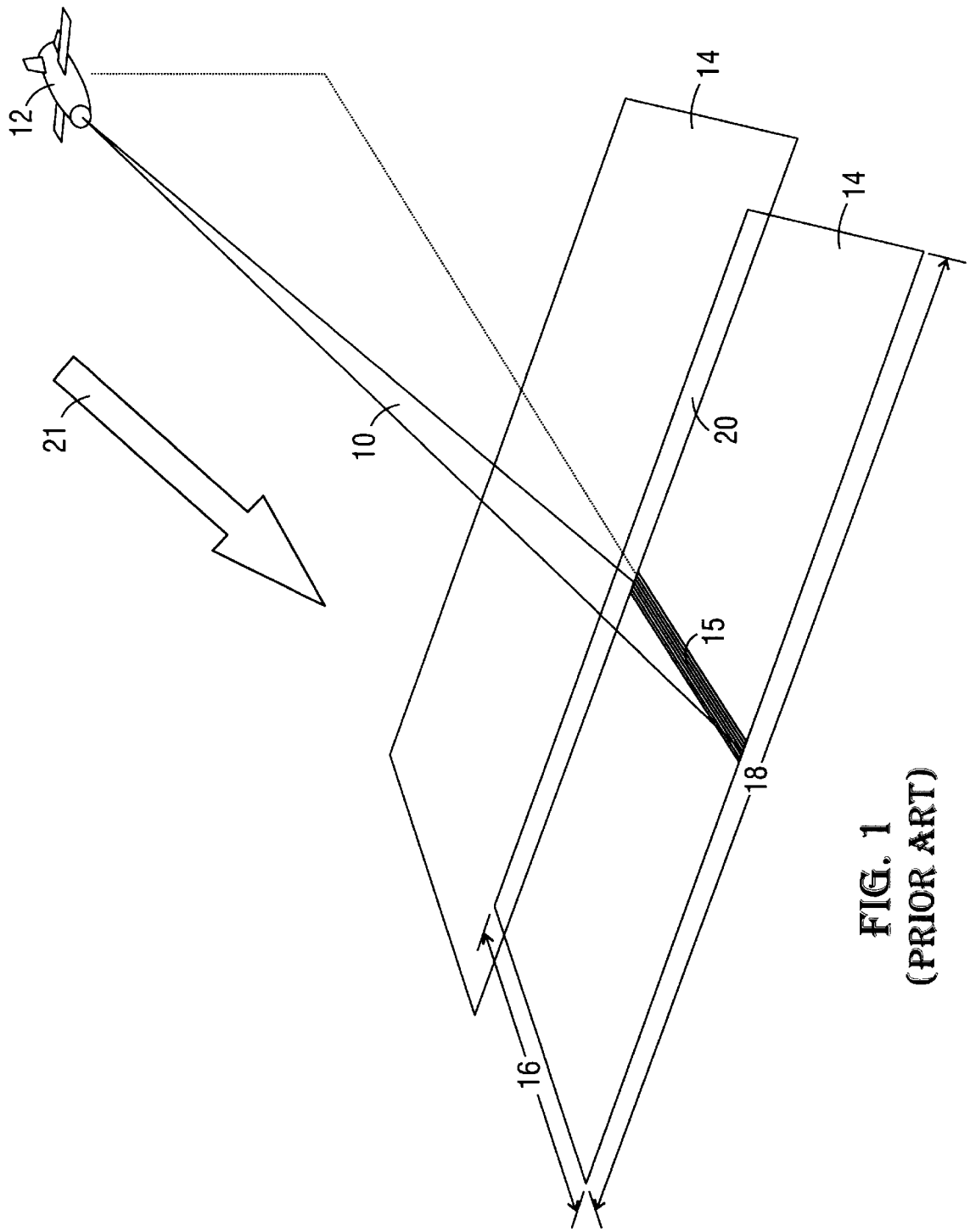
FIG. 1 depicts a prior art LADAR system to illustrate several concepts related to the invention.
Figure 2A:
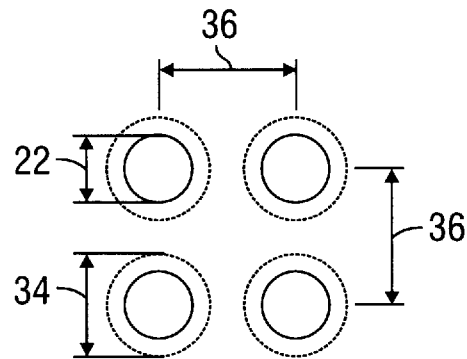
FIGS. 2A–2B illustrate a prior art beam splitting technique used to generate a laser signal for use in a LADAR system.
Figure 2B:
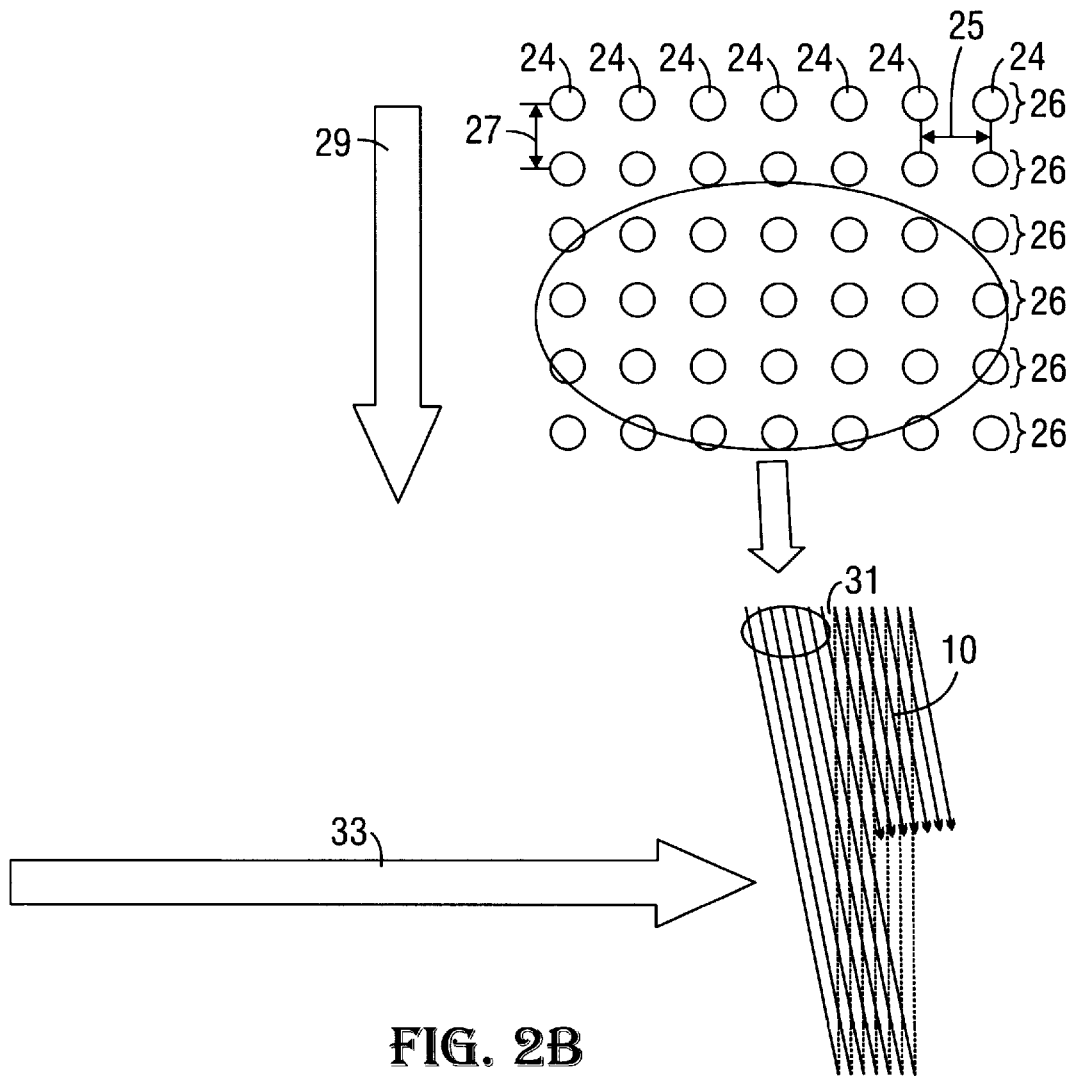

One particular embodiment of the invention is a LADAR seeker head ("LASH") aboard a flying submunition such as the platform 12 in FIG. 1. The manner in which LASH generates, transmits, and receives a LADAR scan pattern is fully disclosed and claimed in U.S. Pat. Nos. 5,200,606; 5,224,109; and 5,285,461, each of which is hereby expressly incorporated by reference for all purposes as if set forth verbatim herein. The LASH LADAR splits a single 0.2 mRad $1/e^2$ laser pulse 22 into seven adjacent pulses 24 known as septets 26 as shown in FIGS. 2A–2B. The individual laser beam detail is shown in FIG. 2A. Laser beam divergence 34 for each spot 22 is 0.2 milliradians and beam separations 36 are 0.4 mRad. The fiber optical array has a row of seven fibers which are spaced to collect the return light. The fibers have an acceptance angle 34 (shown in FIG. 2A) of 0.3 milliradians and a spacing between fibers that matches the 0.4 milliradian far field beam separation 36 (shown in FIG. 2A). The elevation scanner spreads the septets vertically by 0.4 milliradians as it produces the vertical scan angle. The optical transceiver including the scanner is then scanned azimuthally to create a full scan raster.

This particular LADAR system employs a software controlled scanning process that rotates a gimballed optical system to transmit and receive the laser signal 10. The scanning process of the present invention in this embodiment is implemented in a programmable logic device ("PLD") with two elevation scanner waveforms, gimbal control software with two azimuthal scan rates, and image processing software that combines the new nods with the old nods. The elevation scanner drive waveform is generated by the PLD which has two waveforms available and switches between them when commanded from software. The gimbal control software is already programmable with respect to azimuthal scan rate and reducing the azimuth scan rate by one half is available. The image processing software buffers the first portion of the new nod and combines it with the second portion of the new nod and continues the process throughout the entire scan raster.

Figure 3:
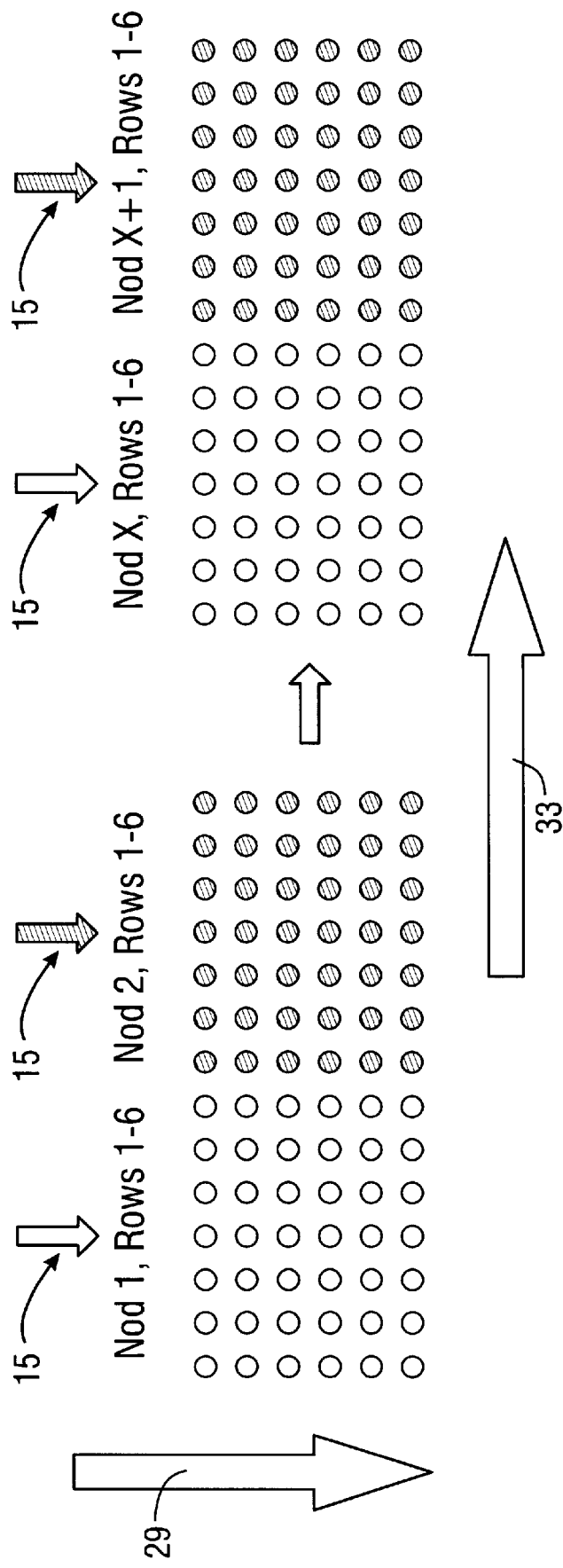
FIG. 3 depicts a nod pattern produced in prior art LADAR systems such as those in FIGS. 1 and 2A–2B.
Figure 6A:
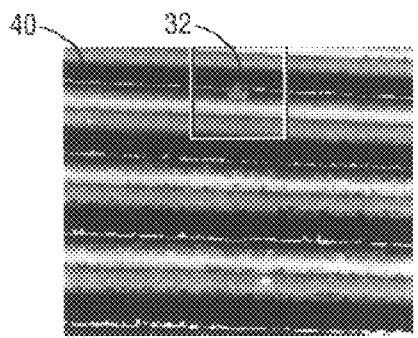
FIGS. 6A–6D are scanned images illustrating the increased resolution in LADAR data resulting from the application of the embodiment in FIGS. 4–5.
Figure 6B:
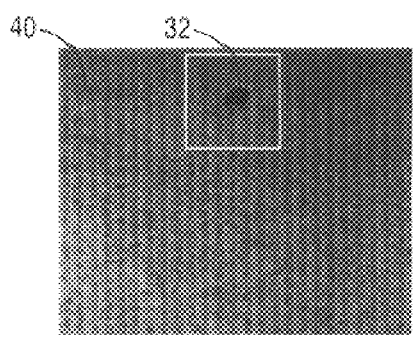
Figure 6C:
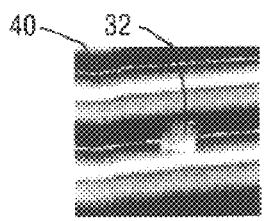
Figure 6D:
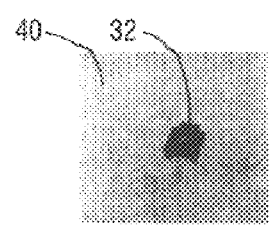

As the platform 12 flies forward, the LADAR seeker head searches for targets. The LASH generates a nod pattern, such as that illustrated in FIG. 3, at a given elevational scan rate and a given azimuthal scan rate. FIGS. 6A–6B illustrate graphical displays 40, including probable target 32, of range and intensity data, respectively, acquired at this first resolution. Upon locating a probable target, the platform 12 in some embodiments, immediately noses down and begins to close on the target initiating a reduced angle target track scan. Upon the occurrence of some predetermined condition, such as probable target location, the LASH switches to higher resolution data acquisition by reducing the elevational and azimuthal scan rates as in FIGS. 4–5. As a further example, the illustrated embodiment implements the invention in software stored in a PLD. However, implementation will be embodiment specific and may even, in some embodiments, necessitate hardware modifications. FIGS.

6C–6D graphically illustrate the images 40 at this increased resolution. The scan waveform drive amplitude is reduced by one half. This makes the septet spacing 0.2 milliradians. The gimbal azimuth rate is also reduced by one half. With the method described above, the seeker can increase the resolution and greatly enhance the ATR's capability to verify that the target is indeed a target before the platform 12 begins maneuvering. Further, the increase in resolution is obtained without changing the optics package hardware used to generate and transmit the laser signal.

The particular embodiments disclosed above are illustrative only as the invention may be modified and practiced in different but equivalent manners apparent to those skilled in the art having the benefit of the teachings herein. For instance, the particular embodiment disclosed above doubles resolution. However, embodiments employing optics packages generating a 0.1 mRad spot size for the beam 22 may be able to triple or quadruple resolution by setting both n and m to 3 or 4, respectively. As a further example, the illustrated embodiment implements the invention in software stored in a PLD. However, implementation will be embodiment specific and may even, in some embodiments, necessitate hardware modifications. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for increasing the resolution of LADAR data at a given elevation scan rate and a given azimuth scan rate], the method comprising:

generating a plurality of nods from a fixed resolution, split beam laser signal at a predetermined elevation scan rate and a predetermined azimuth scan rate; and combining the plurality of nods, including:
   reducing the elevation scan rate by which the laser signal is transmitted by a factor of n; and
   reducing the azimuth scan rate by which the laser signal is transmitted by a factor of m;
   wherein n and m are integers greater than 1.

2. The method of claim 1, further comprising at least one of transmitting the laser signal and receiving the laser signal.

3. The method of claim 2, wherein data obtained from the received laser signal is processed to generate an image.

4. The method of claim 1, wherein n and m are equal.

5. The method of claim 1, wherein the resolution of the LADAR data is doubled.

6. A method for increasing the resolution of LADAR data, the method comprising:

generating a split beam laser signal from a fixed resolution beam splitter, the split beam laser signal including a plurality of nods;

transmitting the laser signal utilizing an elevation scan rate and an azimuth scan rate;

combining the plurality of nods, including:
   reducing the elevation scan rate by which the laser signal is transmitted by a factor of n, wherein n is an integer greater than 1; and
   reducing the azimuth scan rate by which the laser signal is transmitted by a factor of m, wherein m is an integer greater than 1; and
   receiving the reflected laser signal.

7. The method of claim 6, wherein the laser signal's beam is a septet.

8. The method of claim 6, wherein n and m are equal.

9. The method of claim 6, wherein the resolution of the LADAR data is doubled.

10. The method of claim 6, wherein data obtained from the received laser signal is processed to generate an image.

11. A method for obtaining LADAR data, the method comprising:

generating a split beam laser signal from a fixed resolution beam splitter;

transmitting the laser signal at a predetermined elevation scan rate and a predetermined azimuth scan rate;

receiving the reflected laser signal;

obtaining data from the received laser signal; and increasing the resolution of the data upon the occurrence of a predetermined condition including:
    reducing the elevation scan rate by which the laser signal is transmitted by a factor of n, wherein n is an integer greater than 1; and
    reducing the azimuth scan rate by which the laser signal is transmitted by a factor of m, wherein m is an integer greater than 1.

12. The method of claim 11, wherein the laser signal's beam is a septet.

13. The method of claim 11, wherein the predetermined condition is at least one of the detection of an object from the LADAR data and a change in laser transmitter orientation.

14. The method of claim 11, wherein n and m are equal.

15. The method of claim 11, wherein the resolution of the LADAR data is doubled.

16. The method of claim 11, wherein data obtained from the received laser signal is processed to generate an image.

17. A method for doubling resolution in LADAR data obtained from a platform equipped with a LADAR transceiver and used to detect an object, the method comprising:

generating a split beam laser signal from a fixed resolution beam splitter, the beam being split into a septet;

transmitting the laser signal at a predetermined elevation scan rate and a azimuth scan rate;

receiving the reflected laser signal;

processing data from the received laser signal to at least one of present an image of the object and detect the object; and increasing the resolution of the data upon the occurrence of at least one of the detection of the object and a change in the platform's orientation with respect to some predetermined reference by:
    halving the elevation scan rate; and
    halving the azimuth scan rate.

* * * * *